Patented May 13, 1952

2,596,103

UNITED STATES PATENT OFFICE 2,596,103

CRYSTALLINE CALCIUM ASCORBATE AND METHOD OF PREPARING SAME

Simon L. Ruskin, New York, N. Y.

No Drawing. Application March 28, 1947, Serial No. 738,002

2 Claims. (Cl. 260—344.5)

The invention relates to crystalline calcium ascorbate dihydrate and to a process of preparing the same.

The present application is a continuation-in-part of my pending application Serial No. 701,061, filed October 3, 1946.

In prior methods the preparation of calcium ascorbate, the salt was always obtained in the form either of a thick aqueous syrup or an amorphous powder. Neither of these was stable to the atmosphere. Aqueous solutions of the amorphous salt have been widely used for therapeutic purposes. These solutions have been administered by injection, but despite the obvious advantages of administering the salt in the solid form by mouth, this mode of medication has heretofore not been possible because no stable, solid form of the salt had been developed.

Anhydrous, amorphous calcium ascorbate, $(C_6H_7O_6)_2Ca$, has been prepared by adding a slight excess of calcium carbonate to an aqueous solution of ascorbic acid, and evaporating the solution to dryness. The dry residue was triturated with alcohol, and a neutral salt was obtained, which had a pale yellow color. It reportedly had a rotation in aqueous solution of $$(\alpha)_D^{19} = +91$$

The anhydrous salt is hygroscopic, takes up water when exposed to a humid atmosphere, and becomes gummy and decomposes to an orange-colored product. As heretofore prepared for the market, calcium ascorbate is a cream-colored anhydrous powder. Its hygroscopicity was a considerable drawback, not only because it resulted in undesirably altering the physical appearance of the salt, and made air-tight packaging necessary, but it also promoted decomposition of the salt, such instability being highly undesirable because it reduced the therapeutic effectiveness of the salt and even tended to produce more or less toxic by-products.

It is an object of the present invention to provide a new dry, stable form of calcium ascorbate which can be used for oral therapy and is characterized by substantially complete non-hygroscopicity and freedom from discoloration even on long exposure to humid atmospheres.

It is a further object of the invention to provide a new compound, namely crystalline calcium ascorbate dihydrate, having the formula $(C_6H_7O_6)Ca.2H_2O$.

It is a further object of the invention to provide an improved procedure whereby crystalline calcium ascorbate can be manufactured on a large scale, which procedure is inexpensive and yields the salt in a high state of purity and stability.

Other objects will become apparent in the course of the following more detailed description of the inventon.

I have discovered that calcium ascorbate can be prepared in crystalline form as calcium ascorbate dihydrate, and that in such form it is a non-hygroscopic compound, which can be exposed to a humid atmosphere for a long period of time without decomposition or change in color. It exists as white triclinic crystals, which in aqueous solution have a rotation of $$(\alpha)_D^{20} = +95.6(C2.4)$$

Because of its high degree of stability, crystalline calcium ascorbate dihydrate is very well suited for marketing in the form of tablets for oral therapy.

I have found that crystalline calcium ascorbate, which can be employed for seeding solutions of the amorphous salt to produce crystallization when otherwise no crystallization would occur, can be prepared by first precipitating the salt in the form of an amorphous mass from its aqueous solution with the aid of a water-miscible organic solvent like acetone, and the precipitate, preferably after one or more extractions with the organic solvent, then taken up in a small quantity of water. From this strong aqueous solution of the salt a crystalline mass can be obtained on evaporation. Whereas heretofore on mixing of the amorphous calcium ascorbate with water a gummy mass was always obtained, in my improved process, apparently owing to the treatment with the water-miscible organic solvent, the substances which heretofore prevented crystallization are removed. The crystals so obtained contain water of hydration or of crystallization, which was never present in any solid calcium ascorbate prepared prior to my invention.

The crystals obtained with the aid of precipitation and extraction with a water-miscible organic solvent which, in addition to acetone, can be a lower aliphatic alcohol like ethyl and methyl alcohols, or mixtures of these solvents, differ, aside from their crystallinity, also in other physical properties from the salts prepared by Szent-Gyorgyi, Biochemical Journal, vol. 22, (1928), pages 1387 to 1409, and by Herbert et al., Journal of the Chem. Soc. (London), September 1933, pages 1278 to 1279.

In utilizing the crystals obtained with the aid of a water-miscible organic solvent, for the preparation of further batches of the crystals, it is necessary only to prepare a sufficiently concentrated solution of the salt in water. The salt is preferably prepared in fresh form by interacting ascorbic acid with a calcium base, like the carbonate or hydroxide. The crystals so obtained are white in color and remain so for an indefinite period.

In preparing the original crystals with the aid of a water-miscible organic solvent, I prefer to employ ethyl alcohol or acetone, as these solvents yield crystals which are practically snow white in appearance; while when methyl alcohol is employed, the crystals are slightly cream-colored. However, even these crystals, when employed for seeding a saturated aqueous solution of calcium ascorbate will yield substantially snow-white crystals of the salt.

The invention will be further described with the aid of the following examples which are presented purely for purposes of illustration and not as indicating the scope of the invention.

*Example 1*

60 g. ascorbic acid were dissolved in 140 cc. of hot water and cooled to 30° C. To the solution were then added slowly with stirring 16.3 g. calcium carbonate (a little less than ½ mole) and the mixture filtered with suction after $CO_2$ evolution had subsided. (The suction removes $CO_2$ which otherwise precipitates calcium carbonate when the solution is added to acetone in the next operation.) The clear filtrate was pipetted with stirring into 3000 cc. of acetone. Some gum formed at the bottom but there was considerable flocculent precipitate. The gum was kneaded with a stirring rod in the acetone and began to harden, becoming brittle on standing overnight. The following day the brittle gum was broken up. The acetone was decanted and about 300 cc. fresh acetone were added to the precipitate. This was filtered and the precipitate ground up and then treated with 100 cc. more acetone, filtered again, ground up in a mortar, taken up in 200 cc. ether to remove acetone and then, filtered with suction. After the ether had evaporated, the residue was placed in a desiccator. The result was a pure amorphous powder of calcium ascorbate. It contained 9.3% calcium. This contrasts with the analysis of calcium ascorbate described in the literature, which gives Ca=9.9%, the theoretical amount for the anhydrous calcium di-ascorbate being 10.2%.

To 1 g. of this powder there was added 0.5 cc. of water. On evaporation of the water, a stiff mass resulted. This was very unusual because in my previous experience with calcium ascorbate, covering a period of many years, a gum always resulted on the addition of water to calcium ascorbate, or when the calcium ascorbate was exposed to the moisture of the air.

The stiff mass was examined under the microscope and was found to be a large clump of crystals different in appearance from anything previously observed. Analysis showed that the crystals held two molecules of water of hydration or crystallization.

After securing this first batch of crystals it was easy to secure subsequent crystallization. This is a phenomenon well known in crystallography, namely, that once crystals have been obtained they can easily be secured subsequently. By the use of seeds thus obtained, crystallization can be induced in syrups that otherwise would not crystallize. Using this technique, crystallization was obtained in aqueous syrups of calcium ascorbate, as will now be described.

*Example 2*

60 g. of ascorbic acid were dissolved in 140 cc. of hot water which was then cooled to 25° to 30° C. and 16.3 g. calcium carbonate added. The mixture was filtered with suction and the filtrate evaporated in vacuo to a syrup. This was now seeded with a small amount of the crystals obtained according to Example 1, and in a few minutes the syrup solidified into a solid mass of crystals. After about 1 hour, the mother liquor was filtered off with suction and the crystals pressed to remove as much of the mother liquor as possible. This was completed by washing with 400 cc. of absolute ethyl alcohol to remove all the moisture. On drying, the crystals remained white. This was quite unusual since the color of the amorphous calcium ascorbate always turned light yellow or cream on exposure to air and it soon became gummy and difficult to handle. The yield was 49.5% of theory. Higher yields were obtained when the solution was evaporated to a thicker syrup. The crystals remained white and dry after exposure to the humid atmosphere of the laboratory for months.

The analysis of these crystals corresponded to a calcium ascorbate dihydrate and gave the following data:

|  | Found | Calculated for $(C_6H_7O_6)_2$ $Ca.2H_2O$ |
| --- | --- | --- |
| Calcium | 9.42 | 9.25 |
| Carbon | 33.48 | 33.40 |
| Hydrogen | 4.24 | 4.81 |

Specific rotation $[\alpha]_D^{20} = +95.1$ in water (2.4 g. per 100 cc.).

Titration of 0.4000 g. of the calcium ascorbate in 100 cc. N/1 acetic acid solution required 37.34 cc. of N/10 iodine, giving a value of 82.15% ascorbic acid, theory for the dihydrate being 82.63%.

Following the isolation of the crystals, alternative procedures employing ethyl alcohol or isopropyl alcohol may be used to remove the moisture adhering to the crystals.

*Example 3*

60 g. of ascorbic acid were dissolved in 140 cc. hot water and cooled to 25° C. To this solution there were added 16.3 g. calcium carbonate (½ mole), the mixture filtered with suction to remove $CO_2$. There were then added slowly with stirring 235 cc. of ethyl alcohol. The solution was seeded with calcium ascorbate crystals and stirred. After standing about 2 hours beautiful, colorless prismatic crystals formed. The crystals were filtered and washed three times with 35 cc. dilute alcohol (170 cc. absolute alcohol to 100 cc. $H_2O$) then twice with 35 cc. absolute alcohol. Clear white crystals were obtained.

Ascorbic acid titration was 81.8% with iodine.

It is to be noted that whereas in Example 1 the quantity of organic solvent (acetone) is such that precipitation of the calcium ascorbate occurs, in Example 3 the quantity of added water-miscible organic solvent (in the example, ethyl alcohol), is insufficient in relation to the quantity of water, to cause precipitation of the salt.

The crystalline calcium ascorbate obtained by me is substantially insoluble in ethyl and methyl alcohols. Thus, 10 grams of crystalline calcium ascorbate dihydrate, when refluxed with 100 cc. ethyl alcohol for 30 minutes, followed by filtering while hot and drying of the salt residue overnight, lost only 0.1 g. Similarly, when 10 g. of the crystalline material were refluxed on the steam bath for 30 minutes with 100 cc. methyl alcohol, filtered hot, and the residue dried overnight, the loss was only 0.3 g.

A study of the crystallographic and optical properties of the dihydrate of calcium ascorbate was conducted with two lots, one a dry sample, and one a supersaturated liquor in which crystals were forming. The dry sample appeared to be uniform in crystallization, and the crystals had rather definite crystal boundaries. They showed no evidence of deterioration on the boundaries, even after standing for a month in contact with air. In general, they were somewhat elongated triclinic crystals, with the principal optical directions oblique to all edges between crystal faces, and to the general elongation of the crystals. The crystal faces appeared to be in pairs on opposite sides of the crystals.

In the case of the crystals from the concentrated liquor, it was observed that the crystals forming on the sides and bottom of the vessel were larger than those in the dry sample. Also, they did not have well-formed external faces. Optically, they behaved in the same manner as those from the dry sample, and may be assumed to have the same triclinic crystallization. A thin skin of crystals also formed on top of the liquid. Examination of these crystals showed that they were quite different from the other crystals. They were distinctly elongated, being 5 to 10 times as long as they were wide. The cross-section of these prismatic crystals appeared to be square. If this is true, they were almost certainly tetragonal in crystallization. The terminations were usually simple pinacoids, but partly developed pyramids were noted in a few instances. Although the crystal form appeared to change with the degree of dryness, all of the crystals gave identical spectra on X-ray diffraction.

Most of the calcium ascorbate crystals of triclinic form have the greater index vibration direction across the crystal, and the lesser more nearly parallel to the direction of elongation. In some instances, however, this situation is reversed. Hence, the elongation of the crystal is more nearly parallel to the vibration direction of the intermediate index, beta. The greatest dimension perpendicular to the elongation is closest to the vibration direction of the greatest index, gamma, and the shortest dimension is most nearly parallel to the vibration direction of least index, alpha. Because of this orientation, the determination of alpha in the liquid media of low viscosity used in the study is least certain, but the determination of gamma is fairly accurate. The best determination of alpha is that it lies between 1.530 and 1.535, and is nearer 1.530. This figure may be too high. Gamma is very close to 1.680. Beta was not measured directly, but should lie at about the midpoint between the two extremes. The birefringence is 0.150, a very high birefringence, borne out by the high colors shown by the small crystals observed.

The optical figures obtained with the crystals are definitely biaxial. In all cases where the determination seemed definite, they are biaxial negative. A few optic axis figures were observed, and the isogyre has only a slight flexure in the diagonal position. Hence the optical angle is nearly 90 degrees. The isogyres and color bands are sharp, indicating very little dispersion.

In the case of the tetragonal form of crystals, the vibration direction of greater index is parallel to the length of the prisms, and seems to be slightly higher than 1.535. The lesser index is very close to 1.530. Hence the birefringence falls between 1.005 and 0.010. The birefringent colors check with this determination, being low gray for most crystals. No satisfactory optical figures were seen, all being flash figures. This agrees with the interpretation that these are uniaxial crystals with the C axis in the plane of the field. From the index data, the crystals should be uniaxial negative.

The crystal material was studied under high power with a Bausch and Lomb petrographic microscope. The crystals were immersed in liquid media whose indices are within 0.001 of the stated amount. The crystals of the dry sample ranged from about 0.01 mm. to 0.05 mm. in length, and from about 0.005 to 0.03 mm. in width. The triclinic crystals from the supersaturated liquor were much larger, but the tetragonal crystals were about comparable in size to the triclinic crystals from the dry sample.

X-ray diffraction studies were carried out with the following results:

The salt is clearly crystalline. The diagram was taken in a 57.3 mm. radius camera with copper radiation ($\lambda = 1.54$ Å.) nickel filtered. The spacings of the first 16 lines in angstrom units were as follows: (about $\pm 1\%$).

| $d/n$ | 7.20 | 5.73 | 5.38 | 4.82 | 4.67 | 4.19 | 4.05 | 3.92 |
|---|---|---|---|---|---|---|---|---|
| Intensity | v.s. | w.m. | w. | m. | w. | s. | m. | w.m. |
| $d/n$ | 3.72 | 3.49 | 3.27 | 3.15 | 2.99 | 2.95 | 2.79 | 2.71 |
| Intensity | m.s. | m.s. | m.s. | m. | v.w. | w. | s. | w. | s—strong. m—medium. v—very. w—weak.

Owing to the known tendency of ascorbic acid solutions to oxidize and undergo further decomposition, it is desirable to avoid any long standing of solutions of the calcium ascorbate in water or alcohol. The temperature of the solutions should not be allowed to rise much above 30° C. The drying of the crystals with absolute or nearly absolute alcohol was resorted to speed the drying, and the alcohol was removed quickly to avoid oxidation of the crystals with subsequent coloration while in the wet state.

I claim:

1. Stable non-hydroscopic crystalline calcium ascorbate dihydrate having two molecules of water per molecule of calcium ascorbate.

2. Process for the manufacture of crystalline calcium ascorbate which comprises preparing a solution of calcium ascorbate in water, mixing such solution with a quantity of ethyl alcohol insufficient to cause precipitation of the calcium ascorbate, and seeding the solution with calcium ascorbate crystals to cause the formation of a crystalline precipitate of calcium ascorbate.

SIMON L. RUSKIN.

REFERENCES CITED

The following references are of record in the file of this patent:

UNITED STATES PATENTS

| Number | Name | Date |
|---|---|---|
| 2,233,417 | King | Mar. 4, 1941 |
| 2,265,121 | Reichstein | Dec. 2, 1941 |
| 2,383,902 | Yamamoto | Aug. 28, 1945 |
| 2,400,171 | Ruskin | May 14, 1946 |

OTHER REFERENCES

Norris: Experimental Organic Chemistry, 1924, pp. 3 to 5.

Herbert et al.: J. Chem. Soc., pp. 1278–1279 (1933).

Szent-Gyorgyi: Biochem. Jour. 22, 1387–1409, (1928).